Dec. 19, 1939.  R. D. COLGROVE  2,183,546
COUPLING
Filed March 26, 1937
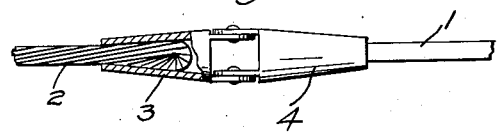
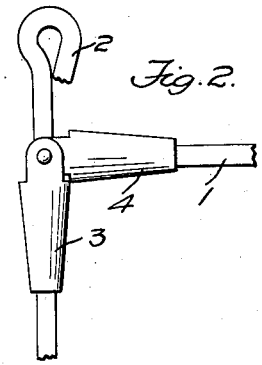
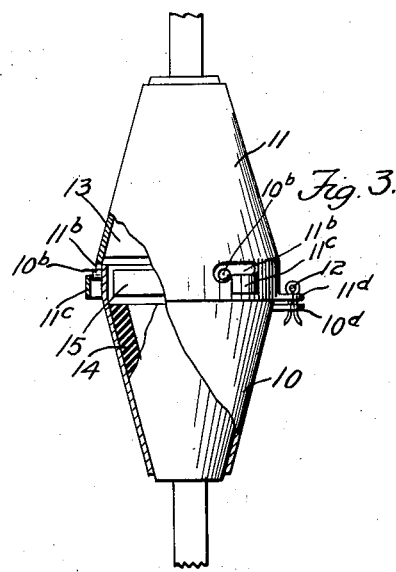
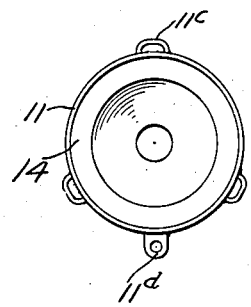
INVENTOR:
R. D. COLGROVE,
BY  O O Martin
ATTORNEY.

Patented Dec. 19, 1939

2,183,546

UNITED STATES PATENT OFFICE 2,183,546

COUPLING

Robert D. Colgrove, Los Angeles, Calif., assignor to John Thorne Lane, Los Angeles, Calif.

Application March 26, 1937, Serial No. 133,206

2 Claims. (Cl. 287—76)

This invention relates to improved means for coupling wire or cable ends together. My invention has not only reference to means for joining the cable ends together but further contemplates insulating such joined ends from each other.

It is the general object of the invention to provide a simple, inexpensive and convenient device for coupling together wire or cable ends. Wires or cables are often joined to form belts hung on pulleys. In such structures, it is essential that the flexibility of the belt is retained at the point of juncture. With this in view, it is a further object of the invention to provide a coupling which is free to flex as it passes over the pulley.

Couplings of the kind herein presented are used to interconnect and to insulate from each other wires and cables leading from electrical conductors, such as trolley wires or power lines. It is a further object of the invention to provide a simple, inexpensive and efficient insulated coupling for such purposes.

With the foregoing in view, the invention consists in the combinations which now will be described and reference is invited to the appended drawing, in which structures embodying the invention are illustrated.

In the drawing:

Figs. 1 and 2 are views of a simple, flexible coupling primarily intended for use on pulley lines, Figs. 3 and 4 illustrate the type of coupling adapted for use on lines which are not required to flex, such as guy wires and the like, and Fig. 5 shows a modified form of coupling for non-flexing lines.

Referring in the first instance to Figs. 1 and 2, it is noted that the numerals 1 and 2 designate wire or cable ends which are anchored in pivotally joined coupling members 3, 4 by bending the cable ends double and by drawing the loops in this manner provided into tapered passages $3^a$, $4^a$ of the coupling members. It is seen that the doubled cable ends become jammed into these passages to form dependable and lasting anchorages for the cable ends. It is also important to note that the small end of said passages, as indicated in Fig. 1, is merely large enough to permit insertion of the cable end and that therefore, when the cable end is bent double, and drawn back into the passages, it is impossible to force the doubled cable portion through the small end of the passages.

The coupling members need never to be taken apart, but are merely swung on their pivots, as indicated in Fig. 2, to insert and thereupon to bend the cable ends. This type of coupling is very efficient where the cable is mounted on pulleys, because it can yield on its pivots to follow the contour of the pulleys.

In cases where such flexing is not required, it may be preferred to use a rigid coupling, such as shown in Figs. 3 and 4. Here, the two members, 10, 11, are made with interfitting annular rims $10^a$, $11^a$, which may be suitably interlocked to maintain the members rigidly combined. The interlocking means illustrated is of the bayonet joint type, comprising a series of projections $10^b$, of the member 10, seated in slots $11^b$, of the member 11. Entrance to these slots is effected through raised arches $11^c$, formed in the rim $11^a$.

In the above structure, the cables are anchored in the members before the latter are joined together, whereupon the members are interlocked, as described. This type of coupling is adapted for use in connection with guy wires and other lines in which the tension on the wire helps to maintain the coupling rigidly combined. In cases where the tension periodically is relaxed, it may be well to provide additional locking means. Such is, in Fig. 3 shown to comprise perforated lips $10^d$, $11^d$ extruded from the material of the coupling members, and a cotter pin 12 is seated in the perforations of these lips.

In many cases, it is required to insulate one cable end from the other, and this may readily be done by seating within the coupling members sleeves 13, 14, made from suitable insulating material, and a plain disc 15, also of insulating material, may be placed within the rims $10^a$, $11^a$ to prevent end to end contact of the cables. Such insulation may also be placed within the coupling members of Figs. 1 and 2, if found necessary.

The coupling of Fig. 5 is a rigid one-piece structure made with tapered passages 20, 21, disposed in opposite directions. The cable ends are inserted from the small end, bent double and then drawn back into the passages in the manner described. When made from insulating material, this coupling forms an efficient and inexpensive device for use in connection with trolley and power line wires.

In the foregoing, structures embodying the invention are described, and I reserve the right to make such further modifications as will come within the scope of the following claims.

I claim:

1. A coupling for cable ends comprising two members and two hinge pins, each member consisting of a conically perforated body portion from which extend two identical parallel perforated lips, one lip being in line with the body outer surface and the other being set in substantially the thickness of the lip, the two members being assembled by placing their lips side by side, one of the hinge pins being rotatably fixed in the perforations of each pair of adjoining lips, the space between the pairs of lips being unobstructed.

2. A cable coupling comprising two identical conically perforated members terminating in parallel interfitting lips, and a hinge pin rotatably fixed in each adjoining pair of lips to hinge the members together, the space between the two pairs of lips being unobstructed for placing and removing cable ends in and from the conical perforations without disturbing the hinge portions.

ROBERT D. COLGROVE.